United States Patent
Yoshigai

(10) Patent No.: US 10,848,635 B2
(45) Date of Patent: Nov. 24, 2020

(54) INFORMATION PROCESSING DEVICE, IMAGE FORMING APPARATUS, IMAGE FORMING SYSTEM, INFORMATION PROCESSING METHOD, AND NON-TRANSITORY COMPUTER-READABLE STORAGE MEDIUM

(71) Applicant: Shigeru Yoshigai, Kanagawa (JP)

(72) Inventor: Shigeru Yoshigai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/253,179

(22) Filed: Jan. 21, 2019

(65) Prior Publication Data

US 2019/0289161 A1 Sep. 19, 2019

(30) Foreign Application Priority Data

Mar. 14, 2018 (JP) ................................ 2018-046768

(51) Int. Cl.
*H04N 1/00* (2006.01)
*B41M 7/00* (2006.01)
*G06F 3/12* (2006.01)
*B41M 5/00* (2006.01)

(52) U.S. Cl.
CPC ...... *H04N 1/00986* (2013.01); *B41M 5/0047* (2013.01); *B41M 7/009* (2013.01); *G06F 3/1208* (2013.01); *G06F 3/1231* (2013.01); *G06F 3/1254* (2013.01)

(58) Field of Classification Search
USPC ........... 355/401, 405, 78–133; 358/1.1–3.29, 358/1.11–1.18, 500–504, 406; 399/9–11, 399/33, 50, 51, 67–75, 94
See application file for complete search history.

(56) References Cited

U.S. PATENT DOCUMENTS

| | | | |
|---|---|---|---|
| 6,353,719 B1 * | 3/2002 | Lee ..................... | G03G 15/2003 399/69 |
| 6,811,840 B1 * | 11/2004 | Cross ................... | B44C 1/1712 428/32.62 |
| 2002/0000054 A1 * | 1/2002 | Rienzo .................. | D06M 10/04 38/74 |
| 2018/0072070 A1 * | 3/2018 | Matoba ................. | B41J 2/2103 |
| 2019/0263109 A1 * | 8/2019 | Richards ............... | B41F 16/02 |

FOREIGN PATENT DOCUMENTS

JP   2001-058398   3/2001

* cited by examiner

*Primary Examiner* — Marcellus J Augustin
(74) *Attorney, Agent, or Firm* — Duft & Bornsen, PC

(57) ABSTRACT

An information processing device includes circuitry. The circuitry is configured to control a temperature of a heater. The heater performs heating in a printing process. The circuitry is further configured to measure an elapsed time from satisfaction of a given condition, and to determine whether the elapsed time is equal to or longer than a given time. The circuitry is configured to cause the temperature of the heater to rise based on a determination that the elapsed time is equal to or longer than the given time.

15 Claims, 15 Drawing Sheets

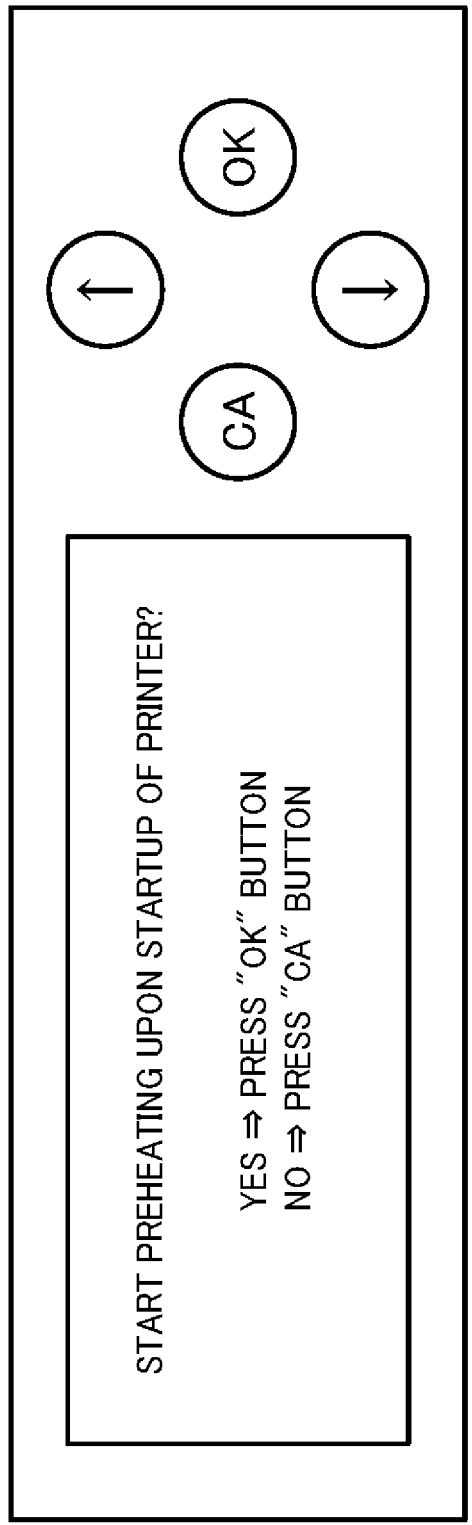

INFORMATION PROCESSING DEVICE, IMAGE FORMING APPARATUS, IMAGE FORMING SYSTEM, INFORMATION PROCESSING METHOD, AND NON-TRANSITORY COMPUTER-READABLE STORAGE MEDIUM

CROSS-REFERENCE TO RELATED APPLICATIONS

This patent application is based on and claims priority pursuant to 35 U.S.C. § 119(a) to Japanese Patent Application No. 2018-046768, filed on Mar. 14, 2018, in the Japan Patent Office, the entire disclosure of which is hereby incorporated by reference herein.

BACKGROUND

Technical Field

Embodiments of the present disclosure relate to an information processing device, an image forming apparatus including the information processing device, an image forming system including the image forming apparatus, an information processing method, and a non-transitory computer-readable storage medium storing computer-readable program code that causes the information processing device to execute the information processing method.

Related Art

Garment printers that form an image on a cloth fabric (hereinafter referred to as a garment) have been developed. Generally, such garment printers smooth out creases on a garment, form an image on the garment, and fix the image onto the garment. Thus, the garment printers print an image on a garment. In order to smooth out creases on a garment and fix an image on the garment, the garment printers heat the garment with a heater.

SUMMARY

In one embodiment of the present disclosure, a novel information processing device includes circuitry. The circuitry is configured to control a temperature of a heater. The heater performs heating in a printing process. The circuitry is further configured to measure an elapsed time from satisfaction of a given condition, and to determine whether the elapsed time is equal to or longer than a given time. The circuitry is configured to cause the temperature of the heater to rise based on a determination that the elapsed time is equal to or longer than the given time.

Also described are novel image forming apparatus including the information processing device, image forming system including the image forming apparatus, information processing method, and non-transitory computer-readable storage medium storing computer-readable program code that causes the information processing device to execute the information processing method.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 15 is a diagram illustrating an example of an operation panel according to a fifth embodiment of the present disclosure.

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 1:
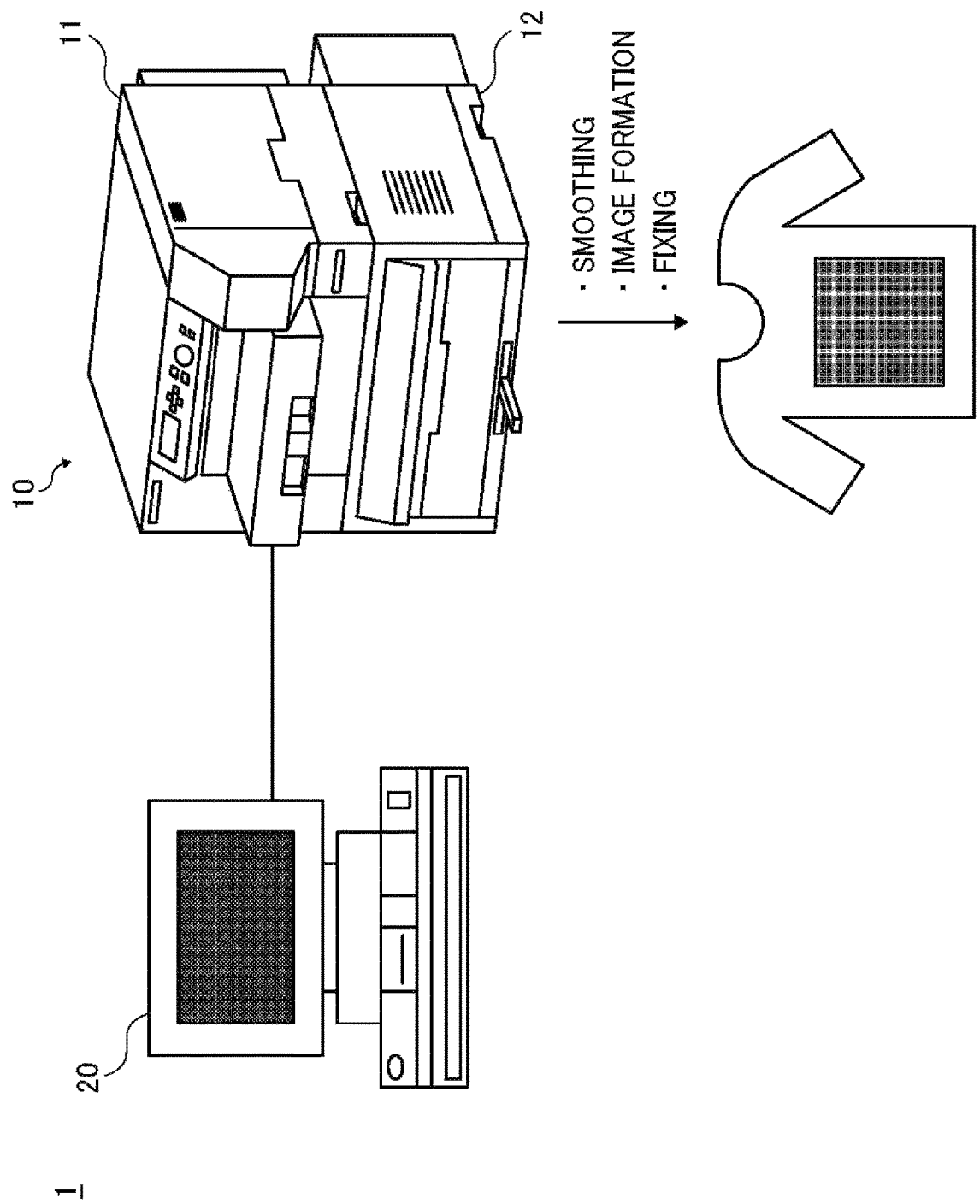
FIG. 1 is a schematic diagram illustrating a hardware configuration of an entire garment printer system according to an embodiment of the present disclosure.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

It is to be noted that, in the following description, suffixes Y, C, M, and K denote colors yellow, cyan, magenta, and black, respectively. To simplify the description, these suffixes are omitted unless necessary.

Referring to the drawings, wherein like reference numerals designate identical or corresponding parts throughout the several views, embodiments of the present disclosure are described below.

The following describes, as an example, a garment printer system for forming an image on a cloth material or garment as a recording medium by an inkjet method. In short, the following description does not limit the embodiments of the present disclosure. For example, the system may be a printing system for forming an image on paper.

Referring now to FIG. 1, a description is given of a schematic diagram illustrating a hardware configuration of an entire garment printer system according to an embodiment of the present disclosure.

FIG. 1 is a schematic diagram illustrating a hardware configuration of an entire garment printer system 1 according to an embodiment of the present disclosure.

The garment printer system 1 of FIG. 1 includes, e.g., a garment printer 10 and a terminal 20. FIG. 1 illustrates an environment in which the garment printer 10 and the terminal 20 are connected to each other via a network such as the Internet or a local area network (LAN). Note that the number of the garment printer 10 and the number of the terminal 20 are not limited to the numbers thereof illustrated in FIG. 1. The garment printer system 1 may include any number of the garment printer 10 and any number of the terminal 20. The garment printer 10 and the terminal 20 are connected to each other via either wired or wireless network.

The garment printer 10 includes an image forming apparatus 11 and a finisher 12. The image forming apparatus 11 forms an image on a garment. Thereafter, the finisher 12 heats the garment to fix the image on the garment. The finisher 12 is also capable of heating and smoothing out creases on the garment before the image is printed on the garment.

The terminal 20 is a device such as a personal computer. The terminal 20 transmits a print job to the garment printer 10 according to user operation. Print configurations are settable on the terminal 20 so that the garment printer 10 executes a print job according to the print configurations.

Figure 2:
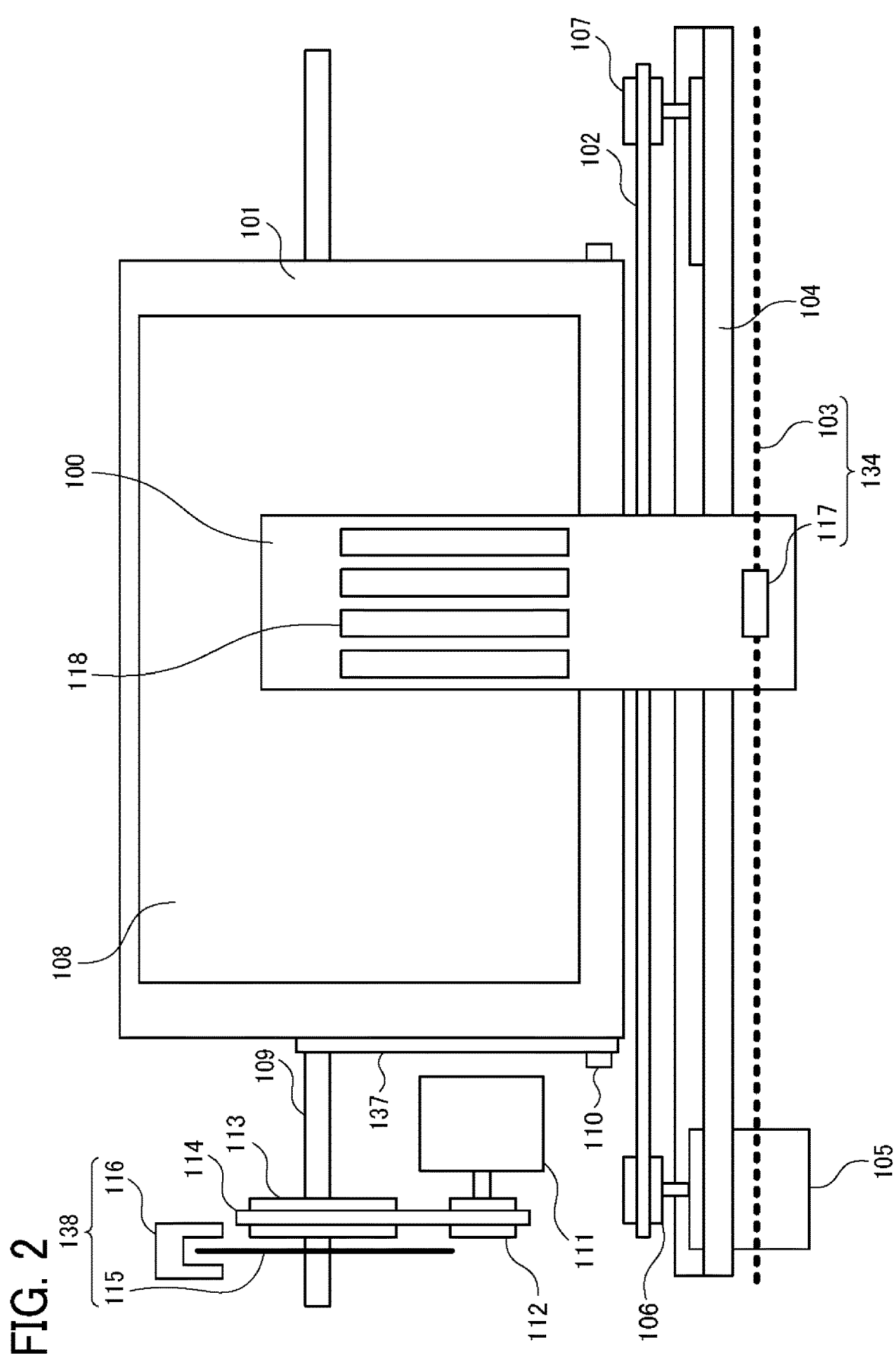
FIG. 2 is a view of an image forming apparatus employing an inkjet printing system.

Referring now to FIG. 2, a description is given of a configuration of the image forming apparatus 11 incorporated in the garment printer 10 described above.

FIG. 2 is a view of the image forming apparatus 11 employing an inkjet printing system according to the present embodiment.

In the garment printer 10, the image forming apparatus 11 includes a carriage 100, a timing belt 102, a slide rail 104, a main scanning motor 105, a driving pulley 106, and a driven pulley 107. The image forming apparatus 11 holds the carriage 100 with the slide rail 104, which is a part of a sheet metal. The main scanning motor 105 moves the carriage 100 to scan in a main scanning direction via the timing belt 102 entrained around the driving pulley 106 and the driven pulley 107.

The carriage 100 carries four recording heads 118, which are liquid discharge heads to discharge ink droplets (i.e., liquid) of different colors such as yellow (Y), cyan (C), magenta (M), and black (K). Each of the four recording heads 118 has a nozzle face on which a plurality of ink discharge ports (i.e., nozzles) are arrayed in a sub-scanning direction perpendicular to the main scanning direction. The four recording heads 118 are aligned on the carriage 100 to discharge ink droplets downward. In FIG. 2, the four recording heads 118 discharge ink droplets of four colors, respectively. Alternatively, the carriage 100 may carry one or more recording heads including a plurality of nozzle arrays for discharging recording liquid droplets of the four colors. The number of colors is not limited to the number described above. The recording heads 118 may be aligned in the order of the four colors (i.e., Y, M, C, and K) described above or in different orders.

The recording head 118, serving as an inkjet head, is provided with a pressure generator that generates pressure for discharging droplets. Examples of the pressure generator include a piezoelectric actuator such as a piezoelectric element, a thermal actuator that employs a thermoelectric conversion element, such as a heating resistor, to use phase changes due to liquid film boiling, a shape-memory alloy actuator that uses metal phase changes due to temperature changes, and an electrostatic actuator that uses electrostatic force.

The carriage 100 is provided with an encoder scale 103 having slits, along the main scanning direction. The carriage 100 is also provided with an encoder sensor 117 that detects the slits of the encoder scale 103. The encoder scale 103 and the encoder sensor 117 construct a linear encoder 134 that detects a location of the carriage 100 in the main scanning direction. A conveyance platen 101, serving as a conveyor, is disposed to convey a recording medium 108 (e.g., garment) such that the recording medium 108 faces the recording heads 118.

A sub-scanning motor 111 drives and rotates a conveyance roller 109 via a timing belt 114 entrained around a conveyance driving pulley 112 and a conveyance roller pulley 113, thereby driving the conveyance platen 101. The conveyance platen 101 is provided with an encoder wheel 115 having slits. The encoder wheel 115 is disposed coaxially with the conveyance roller 109. An encoder sensor 116 is disposed on a side plate to detect the slits of the encoder wheel 115. The encoder wheel 115 and the encoder sensor 116 construct a wheel encoder 138 that detects a location of the conveyance platen 101 in the sub-scanning direction. The conveyance platen 101, which is a flatbed, is conveyed horizontally in the sub-scanning direction by a conveyor belt 137 entrained around the conveyance roller 109 and a tension roller 110.

Figure 3:
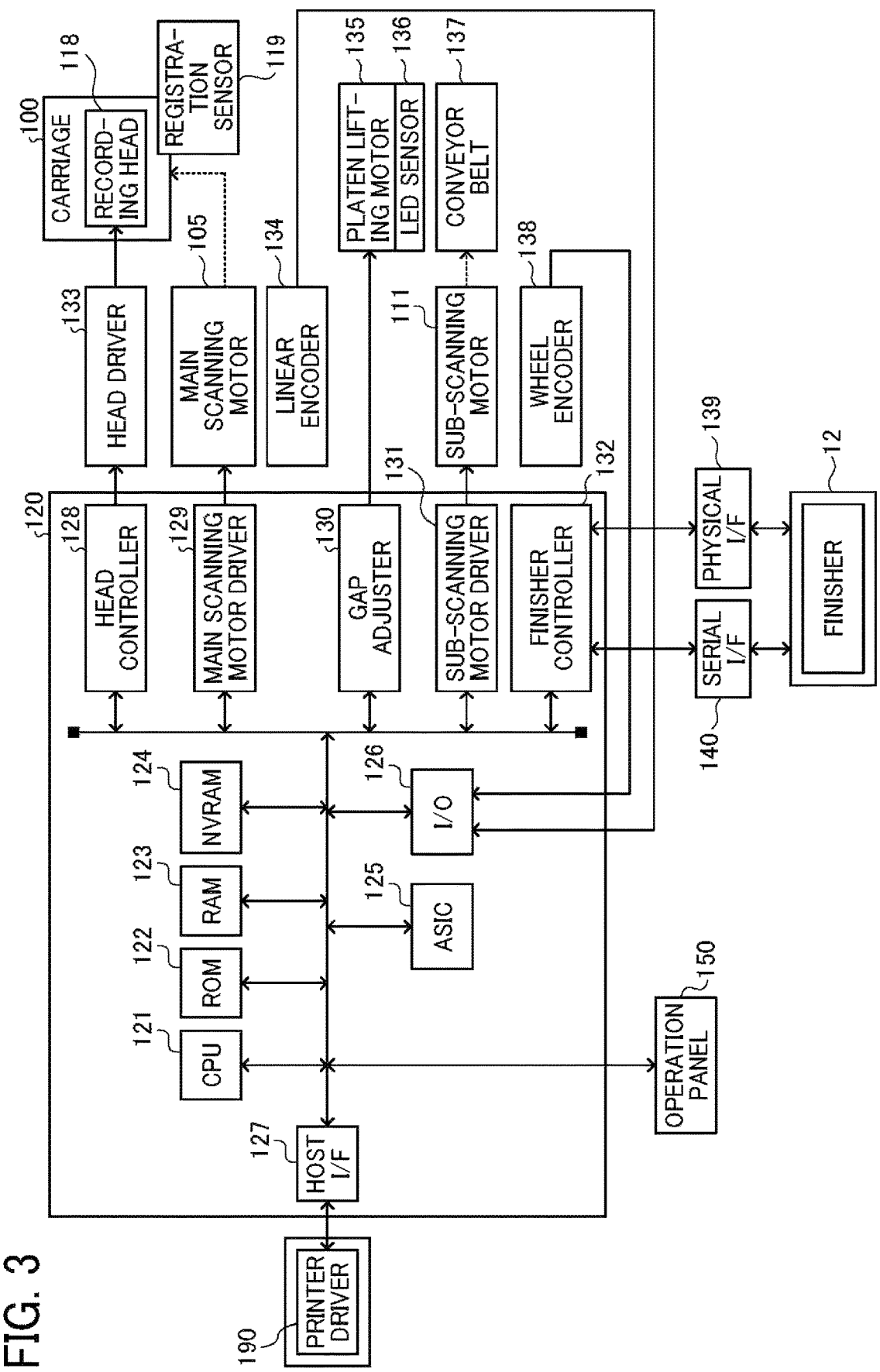
FIG. 3 is a diagram illustrating a hardware configuration of the image forming apparatus according to an embodiment of the present disclosure.

Referring now to FIG. 3, a description is given of a hardware configuration of the image forming apparatus 11 described above.

FIG. 3 is a diagram illustrating the hardware configuration of the image forming apparatus 11 according to the present embodiment.

The image forming apparatus 11 includes a controller 120. The controller 120 includes a central processing unit (CPU) 121, a read only memory (ROM) 122, a random access memory (RAM) 123, non-volatile random access memory (NVRAM) 124, and application specific integrated circuit (ASIC) 125. The CPU 121 is an information processing device that controls the entire machine while controlling conveyance of a garment and movement of the recording heads 118. The ROM 122 stores programs that are executed by the CPU 121 and other fixed data. The RAM 123 temporarily stores image data and the like. The NVRAM 124 is a rewritable memory that holds data even while the machine power is shut off. The ASIC 125 performs various kinds of signal processing with respect to image data, image processing such as sorting, and input/output signal processing to control the entire machine.

The controller 120 further includes an input/output (I/O) 126, a host interface (I/F) 127, a head controller 128, a main scanning motor driver 129, a sub-scanning motor driver 131, and The host I/F 127 sends and receives data and signals to and from a host. A head controller 128 generates a driving waveform for driving the recording head 118. The head controller 128 outputs, to a head driver 133, image data and associated data for selectively driving the pressure generator of the recording head 118. The main scanning motor driver 129 drives the main scanning motor 105. The sub-scanning motor driver 131 drives the sub-scanning motor 111. The I/O 126 inputs detection pulses from the linear encoder 134 and the wheel encoder 138 and detection signals from other sensors. The controller 120 is connected with an operation panel 150 through which information is input to the garment printer 10. The operation panel 150 also displays information.

A registration sensor 119 mounted on the carriage 100 senses recording media.

The controller 120 receives e.g., print job data generated by a printer driver 190 of the host, such as the terminal 20 (e.g., personal computer), an image reader (e.g., image scanner), or an imaging device (e.g., digital camera), with the host I/F 127 via a cable or a network.

The CPU 121 of the controller 120 reads and analyzes print data in a receive buffer included in the host I/F 127. The ASIC 125 performs image processing including data sorting with respect to the print data. The ASIC 125 then transmits the print data thus processed to the head controller 128. The head controller 128 is timed to output image data and a driving waveform to the head driver 133. Note that font data may be stored in the ROM 122, for example, for generation of dot pattern data for image output. Alternatively, as in the present embodiment, the printer driver 190 of the host may convert the image data into bitmap data and transfer the bitmap data to the garment printer 10.

A driving waveform generation unit of the head controller 128 is constructed of, e.g., an amplifier and a digital-to-analog (D/A) converter that performs digital-to-analog conversion on pattern data of a driving pulse stored in the ROM 122 and read by the CPU 121. The driving waveform generation unit outputs, to the head driver 133, a driving waveform constructed of one or more driving pulses.

According to serially-input image data (i.e., dot pattern data) corresponding to one line of the recording head 118, the head driver 133 selectively applies, to the pressure generator of the recording head 118, the one or more driving pulses constructing the driving waveform transmitted from the driving waveform generation unit of the head controller 128, thereby driving the recording head 118. Note that the head driver 133 includes, e.g., a shift register, a latch circuit, a level conversion circuit, and an analog switch array. The shift register inputs a clock signal and serial data, which is image data. The latch circuit latches a register value of the shift register with a latch signal. The level conversion circuit (or a level shifter) changes a level of an output value of the latch circuit. The level shifter also turns on and off the analog switch array (or a switch). By turning on and off the analog switch array, the head driver 133 selectively applies, to the pressure generator of the recording head 118, the one or more driving pulses constructing the driving waveform.

The controller 120 further includes a gap adjuster 130 and a finisher controller 132.

The gap adjuster 130 drives the conveyance platen 101 up and down with a platen lifting motor 135. The gap adjuster 130 detects the conveyance platen 101 with a light emitting diode (LED) sensor 136 to adjust the height of the conveyance platen 101.

The finisher controller 132 controls the finisher 12 while sending and receiving data to and from the finisher 12. Specifically, the finisher controller 132 turns on the finisher 12 with a physical I/F 139; whereas the finisher controller 132 sends and receives data to and from the finisher 12 with a serial I/F 140 such as RSR232C.

A description has been given of a hardware configuration of the garment printer 10 according to an embodiment of the present disclosure.

Figure 4:
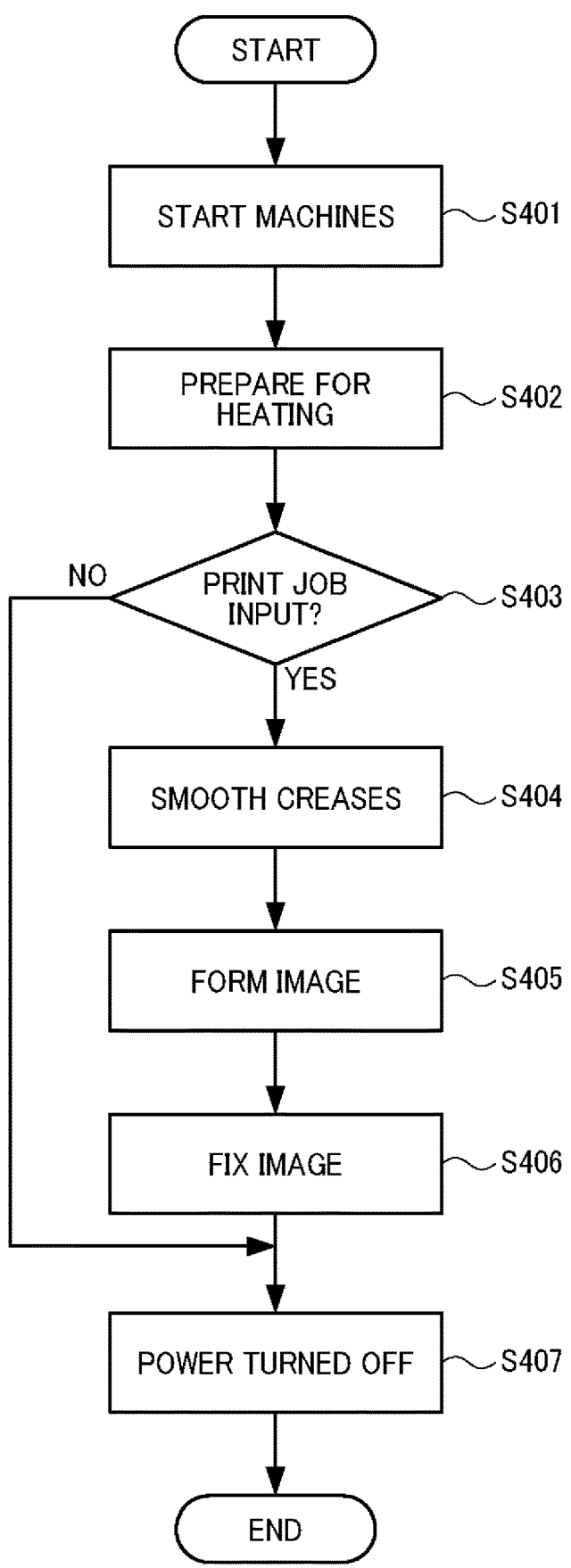
FIG. 4 is a flowchart of a comparative process executed by a garment printer.
Figure 5:
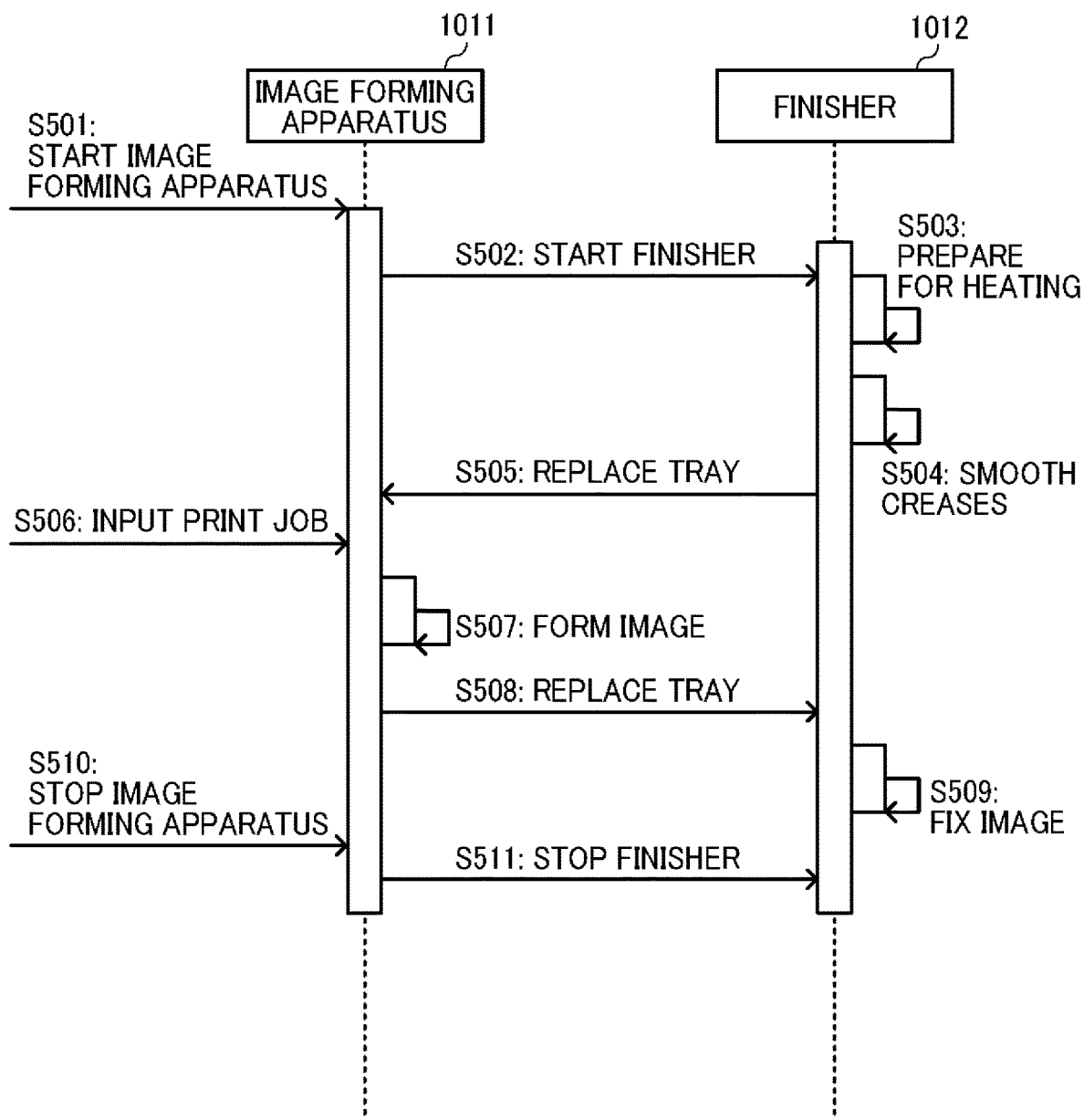
FIG. 5 is a sequence diagram illustrating comparative processes executed by an image forming apparatus and a finisher.

Referring now to FIGS. 4 and 5, a description is given of comparative operation performed by a comparative garment printer.

Initially with reference to FIG. 4, a description is given of a comparative process executed by a comparative garment printer.

FIG. 4 is a flowchart of the comparative process executed by the comparative garment printer.

The garment printer starts the process with the power being turned on.

In step S401, the garment printer starts an image forming apparatus 1011 and a finisher 1012 constructing the garment printer.

As the image forming apparatus 1011 and the finisher 1012 start up, the garment printer prepares for heating in step S402.

Now, a detailed description is given of the heating preparation, that is, how the garment printer prepares for heating in step S402.

In order to accurately form an image on a garment, the garment printer smooths out creases on the garment before an image forming process, which is a process of forming an image on a garment. After the image forming process, the garment printer heats the garment to fix the image onto a surface of the garment. Specifically, a heating unit of the finisher 1012 heats the garment. It takes time for the heating unit to reach a given temperature enough to perform a smoothing process, that is, to smooth out creases on the garment. It also takes time for the heating unit to reach a given temperature enough to perform a fixing process, that is, to fix the image on the garment. To address such a situation, it is preferable that the heating unit reaches the given temperature before the smoothing process. It is also preferable that the heating unit reaches the given temperature before the fixing process. Accordingly, the garment printer performs the heating preparation in advance, thereby shortening time until the heating unit reaches the given temperature. Note that, in the heating preparation, the heating unit may be heated to the given temperature or to a temperature so as to relatively shorten the time until the heating unit reaches the given temperature.

After preparing for heating in step S402, the garment printer determines whether a print job is input in step S403. Here, the process branches out and takes different paths according to the determination. The print job is data including an image to be formed, printing conditions, and the like. The print job is transmitted from a terminal, such as the terminal 20, via a printer driver such as the printer driver 190, for example. When the garment printer determines that the print job is not input (NO in step S403), the process proceeds to step S407; a detailed description thereof is deferred. On the other hand, when the garment printer determines that the print job is input (YES in step S403), the process proceeds to step S404.

In step S404, the garment printer heats a garment to smooth out creases on the garment, as a pre-process before forming an image on the garment.

In step S405, the garment printer forms an image on the garment.

In step S406, the garment printer heats the garment to fix the image on a surface of the garment.

In step S407, the power of the garment printer is turned off.

Thus, the process ends.

Referring now to a sequence diagram illustrated in FIG. 5, a description is given of the process described above with reference to FIG. 4.

FIG. 5 is a sequence diagram illustrating comparative processes executed by the image forming apparatus 1011 and the finisher 1012.

In step S501, the image forming apparatus 1011 is started.

As the image forming apparatus 1011 is started, the finisher 1012 is started in step S502.

As the finisher 1012 is started, the finisher 1012 prepares for heating in step S503, raising a temperature of the heating unit.

In step S504, the finisher 1012 performs a smoothing process, that is, the finisher 1012 smooths out creases on a garment on which an image is to be formed. Note that the garment is attached to a cassette or tray and set in the finisher 1012.

After the smoothing process in step S504, the tray is replaced in step S505. Specifically, the tray is removed from the finisher 1012 and loaded into the image forming apparatus 1011.

In step S506, a print job is input to the image forming apparatus 1011. Note that the print job may be input in another step or timing. For example, the print job may be input before step S506.

In step S507, the image forming apparatus 1011 forms an image on the garment according to the print job. Note that the image formation (i.e., image forming process) may be started in response to a start key being pressed on the operation panel 150.

After completion of the image forming process, the tray is replaced in step S508. Specifically, the tray is removed from the image forming apparatus 1011 and loaded into the finisher 1012.

In step S509, the finisher 1012 executes a fixing process. In the fixing process, the heating unit heats the garment to fix inks, which are contained in the image formed in the image forming process, to the garment. After completion of the fixing process, the tray is removed from the finisher 1012 to take out the garment.

In addition, after completion of the fixing process, the image forming apparatus 1011 is stopped in step S510.

In step S511, the finisher 1012 is stopped.

Note that the image forming apparatus 1011 and the finisher 1012 may be started and stopped in conjunction with each other.

As described above, upon starting the image forming apparatus 1011, the comparative garment printer raises the temperature of the heating unit, thereby preparing for heating. Such comparative garment printers start heating the heating unit even when the image forming apparatus is started simply for settings, for example. In such a case, the comparative garment printers waste energy. By contrast, according to the embodiments of the present disclosure, the garment printer 10 waits to heat a heating unit 650 (illustrated in FIG. 6) until a certain time has elapsed after activation of machine, thereby saving energy.

Figure 6:
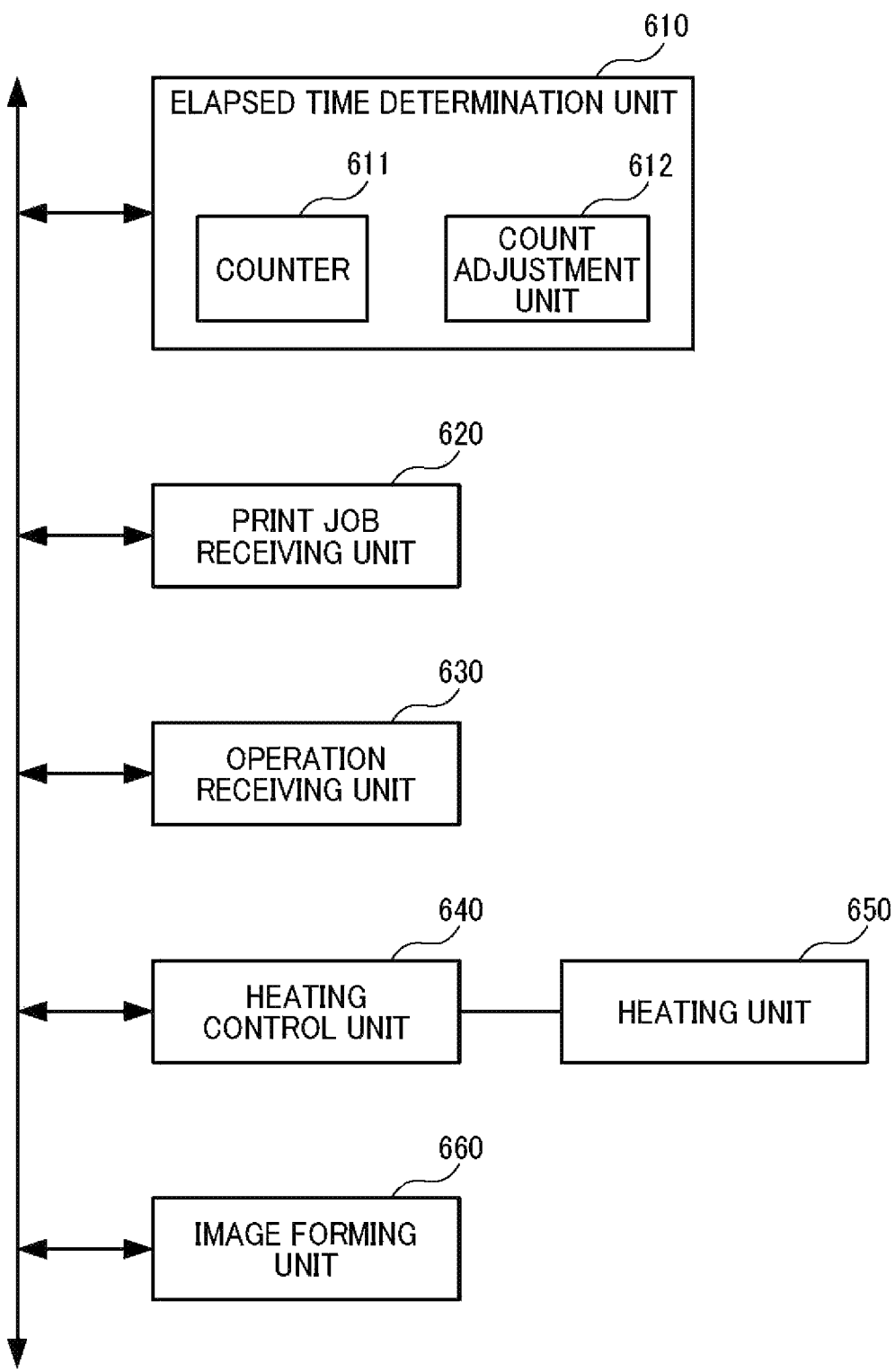
FIG. 6 is a block diagram illustrating a software configuration of a garment printer according to an embodiment of the present disclosure.

Referring now to FIG. 6 a description is given of functions executed by hardware according to the embodiments of the present disclosure.

FIG. 6 is a block diagram illustrating a software configuration of the garment printer 10 according to an embodiment of the present disclosure.

The garment printer 10 includes an elapsed time determination unit 610, a print job receiving unit 620, an operation receiving unit 630, a heating control unit 640, the heating unit 650, and an image forming unit 660.

A detailed description is now given of each of the units described above.

The elapsed time determination unit 610 includes a counter 611 as an example of an elapsed time measurement unit that measures an elapsed time. The counter 611 starts measuring time in response to activation of machine or satisfaction of a given condition, for example. The elapsed time determination unit 610 determines whether the time measured by the counter 611 has reached a given time. In other words, the elapsed time determination unit 610 determines whether the elapsed time measured by the counter 611 is equal to or longer than the given time. When the elapsed time determination unit 610 determines that the given time has elapsed, the elapsed time determination unit 610 notifies the heating control unit 640 of the elapse of the given time.

In an embodiment, the elapsed time determination unit 610 includes a count adjustment unit 612 as an example of an elapsed time adjustment unit. The count adjustment unit 612 adjusts the time measured by the counter 611. The count adjustment unit 612 is capable of stopping the counter 611 from measuring time or resetting the time measured by the counter 611 when it is preferable to delay the start of heating preparation according to user operation, for example.

The print job receiving unit 620 receives a print job output from the printer driver 190. The print job receiving unit 620 transfers the print job thus received to the image forming unit 660 so that the image forming unit 660 executes the print job. In addition, the print job receiving unit 620 is capable of notifying the heating control unit 640 of the reception of the print job. Thus, the reception of a print job triggers heating preparation.

The operation receiving unit 630 receives a user operation or an instruction from a user through the operation panel 150, for example. In response to the operation, the operation receiving unit 630 executes a process according to the operation while notifying the elapsed time determination unit 610 of the reception of the operation. The notification allows the count adjustment unit 612 to stop the counter 611 from measuring time or to reset the time measured by the counter 611. Note that the operation receiving unit 630 may receive an operation or instruction through, e.g., the terminal 20, other than the operation panel 150 described above.

The heating control unit 640 causes the heating unit 650 to reach a given temperature. The heating control unit 640 is capable of controlling a temperature of the heating unit 650 when the image forming apparatus 11 is started, or in response to notifications that conditions are satisfied. For example, the heating control unit 640 controls the temperature of the heating unit 650 when a given time elapses, or when a print job is received.

The heating unit 650 is a heater that performs heating in a printing process. For example, the heating unit 650, serving as a heater, heats a garment in the smoothing and image fixing processes. The heating control unit 640 causes the heating unit 650 to reach a given temperature to heat the garment.

The image forming unit 660 controls operations of, e.g., the carriage 100, the motors, and the recording heads 118 according to a print job, to form an image on a surface of a garment set in the image forming apparatus 11.

Note that the CPU 121 executes programs of the present embodiment to function the hardware described above, thereby implementing functional units corresponding to the units described above with reference to the block diagram illustrated in FIG. 6. All of the functional units according to the embodiments of the present disclosure may be implemented by software. Alternatively, a part or all of the functional units may be implemented as hardware providing equivalent functions.

FIG. 6 illustrates a configuration in which the image forming apparatus 11 includes the elapsed time determination unit 610, the print job receiving unit 620, the operation receiving unit 630, the heating control unit 640, and the image forming unit 660; whereas the finisher 12 includes the heating unit 650. The configuration is not limited to thereto. Alternatively, the functional units illustrated in FIG. 6 may be implemented by cooperation of the image forming apparatus 11, the finisher 12, and the terminal 20, for example.

The following describes some embodiments of the present disclosure in detail. Note that the descriptions of identical processes and the like in the embodiments are omitted unless otherwise required.

Figure 7:
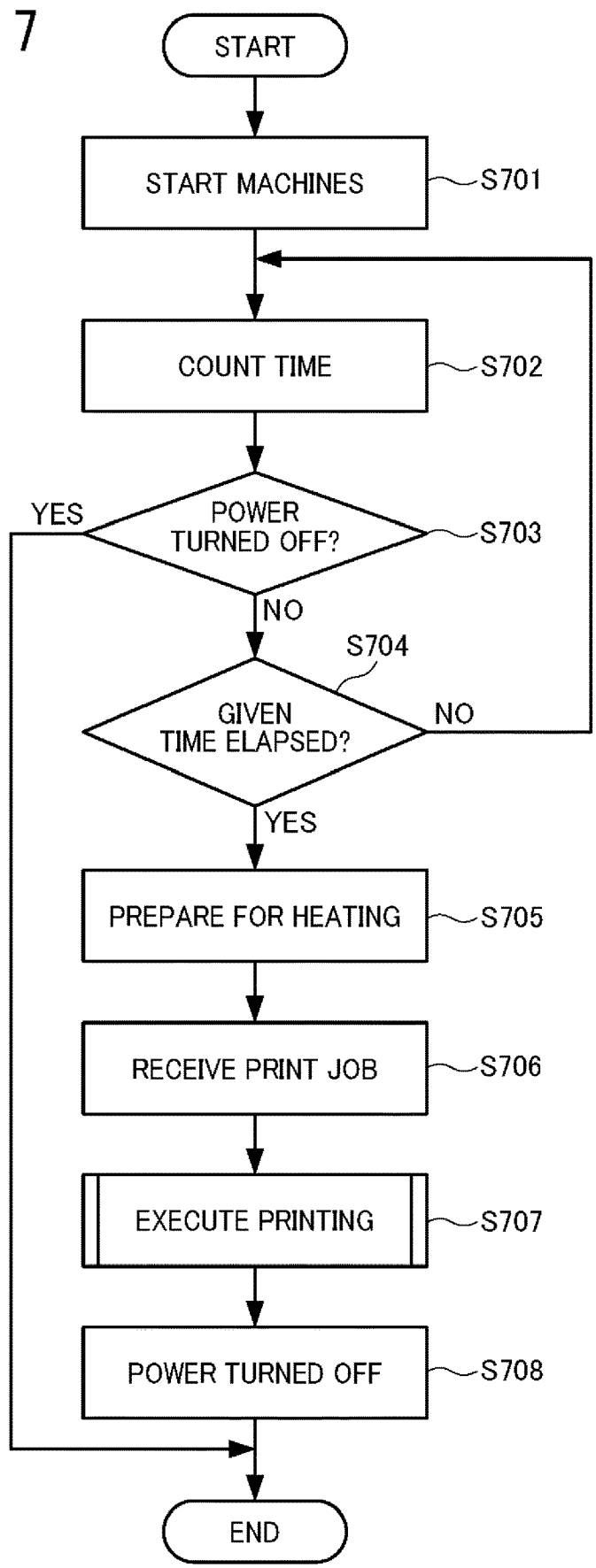
FIG. 7 is a flowchart of a process executed by a garment printer according to a first embodiment of the present disclosure.
Figure 8:
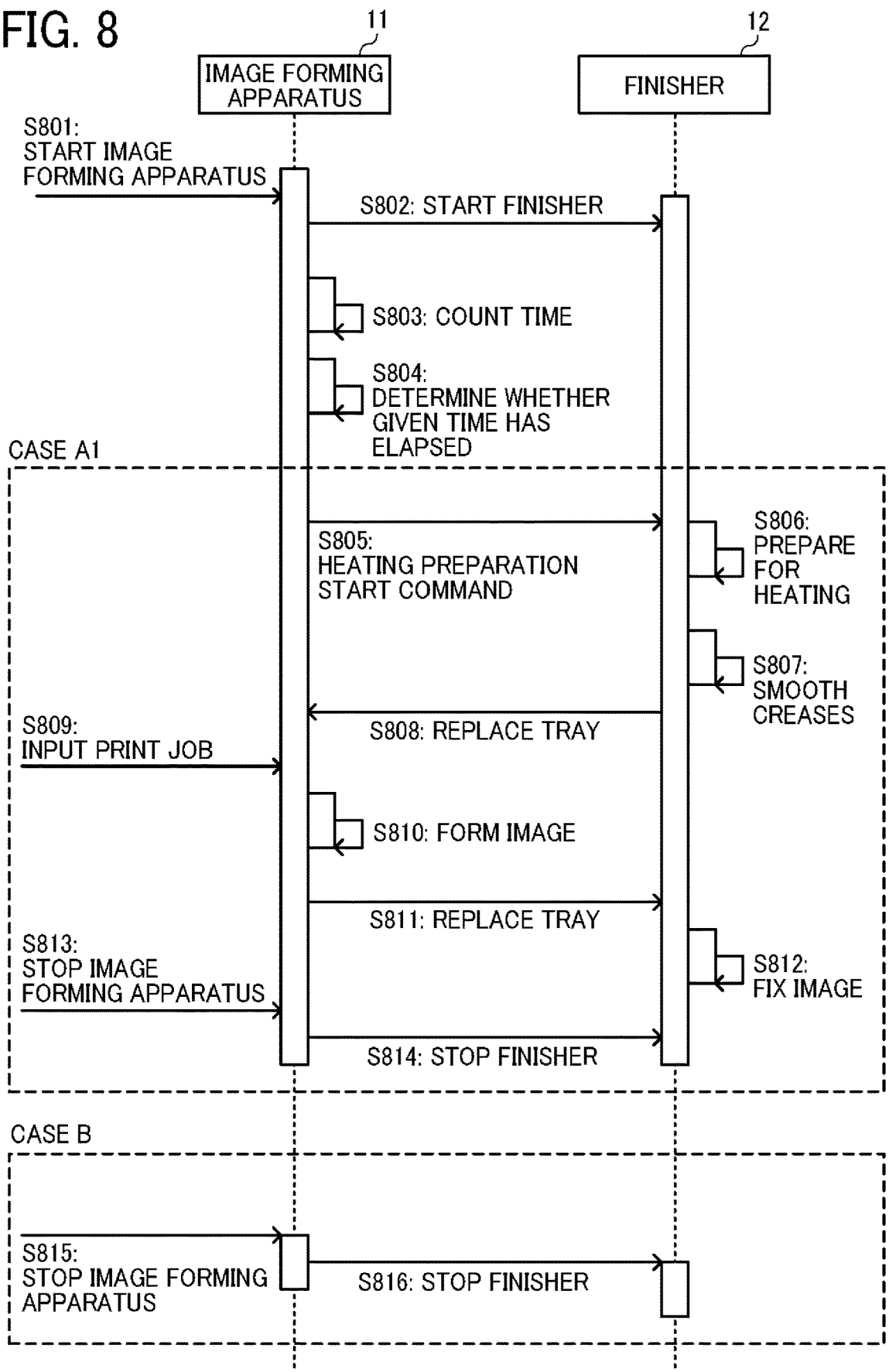
FIG. 8 is a sequence diagram illustrating processes executed by an image forming apparatus and a finisher according to the first embodiment of the present disclosure.

Initially with reference to FIGS. 7 and 8, a description is given of a first embodiment of the present disclosure.

In the first embodiment, the garment printer 10 waits to raise the temperature of the heating unit 650 until a certain time has elapsed after activation of machine.

Referring now to FIG. 7, a description is given of a process executed by the garment printer 10 according to the first embodiment of the present disclosure.

FIG. 7 is a flowchart of the process executed by the garment printer 10 according to the first embodiment of the present disclosure.

The garment printer 10 starts the process with the power being turned on.

As the garment printer 10 is powered, the garment printer 10 starts the image forming apparatus 11 and the finisher 12 in step S701.

As the image forming apparatus 11 is started, the counter 611 starts counting time in step S702.

In step S703, the garment printer 10 determines whether the power is turned off while the counter 611 measures time elapsed. Here, the process branches out and takes different paths according to the determination. Specifically, when the garment printer 10 determines that the power is turned off (YES in step S703), then, the process ends. In this case, the heating unit 650 is not heated, thereby saving energy. On the other hand, when the garment printer 10 determines that the power is not turned off (NO in step S703), the process branches out to step S704.

In step S704, the elapsed time determination unit 610 determines whether a given time has elapsed. Here, the process branches out and takes different paths according to the determination. The elapsed time determination unit 610 compares the time measured by the counter 611 with the given time, thereby determining whether the given time has elapsed. The given time is a time arbitrarily set in advance. For example, the given time is a period of time until it becomes a high probability that a user is ready to execute printing.

When the elapsed time determination unit 610 determines that the given time has not elapsed yet (NO in step S704), the process returns to step S702. In this case, the processing of step S702 to step S704 repeats until the given time has elapsed.

On the other hand, when the elapsed time determination unit 610 determines that the given time has elapsed (YES in step S704), the process proceeds to step S705.

In step S705, the heating control unit 640 controls the heating unit 650 to prepare for heating. Specifically, the elapsed time determination unit 610 notifies the heating control unit 640 that the given time has elapsed. In response to the notification, the heating control unit 640 causes the heating unit 650 to raise the temperature. Note that the heating preparation here is equivalent to step S402 described above. Therefore, a detailed description thereof is herein omitted.

In step S706, the print job receiving unit 620 receives a print job input. In this case, the print job is input in step S706. The print job may be input at another time, other than step S706 in FIG. 7.

In step S707, the garment printer 10 executes printing or a printing process. Note that the printing process performed in step S707 is equivalent to the processes in steps S404 to S406 described above.

After the garment printer 10 completes the printing process, the power is turned off in step S708, stopping the image forming apparatus 11 and the finisher 12.

Thus, the process ends.

Referring now to FIG. 8, a description is given of processes executed by the image forming apparatus 11 and the finisher 12 according to the first embodiment of the present disclosure.

FIG. 8 is a sequence diagram illustrating the processes executed by the image forming apparatus 11 and the finisher 12 according to the first embodiment of the present disclosure.

In step S801, the image forming apparatus 11 is started.

As the image forming apparatus 11 is started, the finisher 12 is started in step S802.

In step S803, the counter 611 counts time.

In step S804, the elapsed time determination unit 610 compares the time measured by the counter 611 with the given time, to determine whether the given time has elapsed.

In a case A1 in which the elapsed time determination unit 610 determines that the given time has elapsed, the heating control unit 640 transmits a heating preparation start command to the heating unit 650 of the finisher 12 in step S805.

In response to the notification, the heating unit 650 raises the temperature to prepare for heating in step S806.

In steps S807 to S814, the image forming apparatus 11 and the finisher 12 execute print processing to print an image on a garment. Note that the processing of steps S807 to S814 is equivalent to the processing of steps S504 to S511 described above. Therefore, a detailed description of the processing of steps S807 to S814 is herein omitted.

On the other hand, in a case B in which the power is turned off during a heating standby, the image forming apparatus 11 is stopped in step S815.

In step S816, the finisher 12 is stopped.

According to the first embodiment, the garment printer 10 waits to raise the temperature of the heating unit 650 until the given time has elapsed after starting the image forming apparatus 11. That is, the garment printer 10 does not raise the temperature of the heating unit 650 when the garment printer 10 does not execute a process accompanying the heating. For example, when the garment printer 10 starts the image forming apparatus 11 simply for setting, the garment printer 10 does not raise the temperature of the heating unit 650. Thus, the garment printer 10 reduces power consumption compared to comparative garment printers, thereby saving energy.

Figure 9:
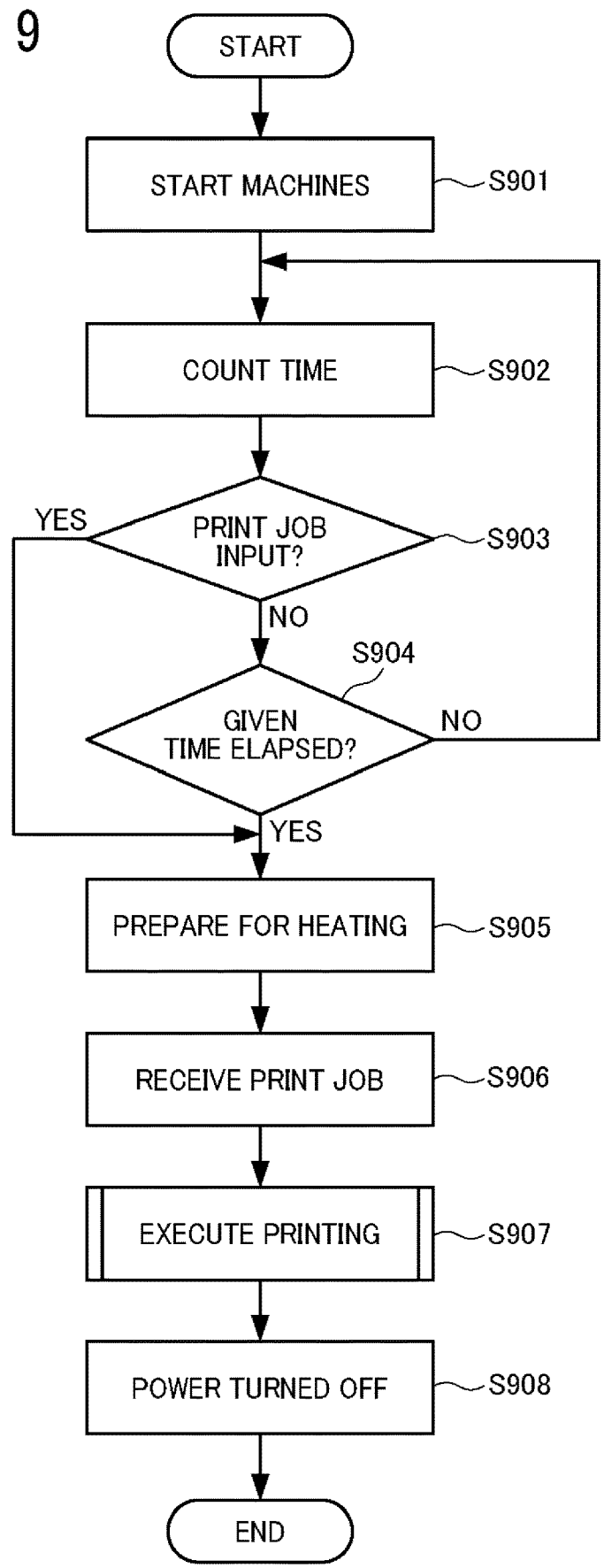
FIG. 9 is a flowchart of a process executed by a garment printer according to a second embodiment of the present disclosure.
Figure 10:
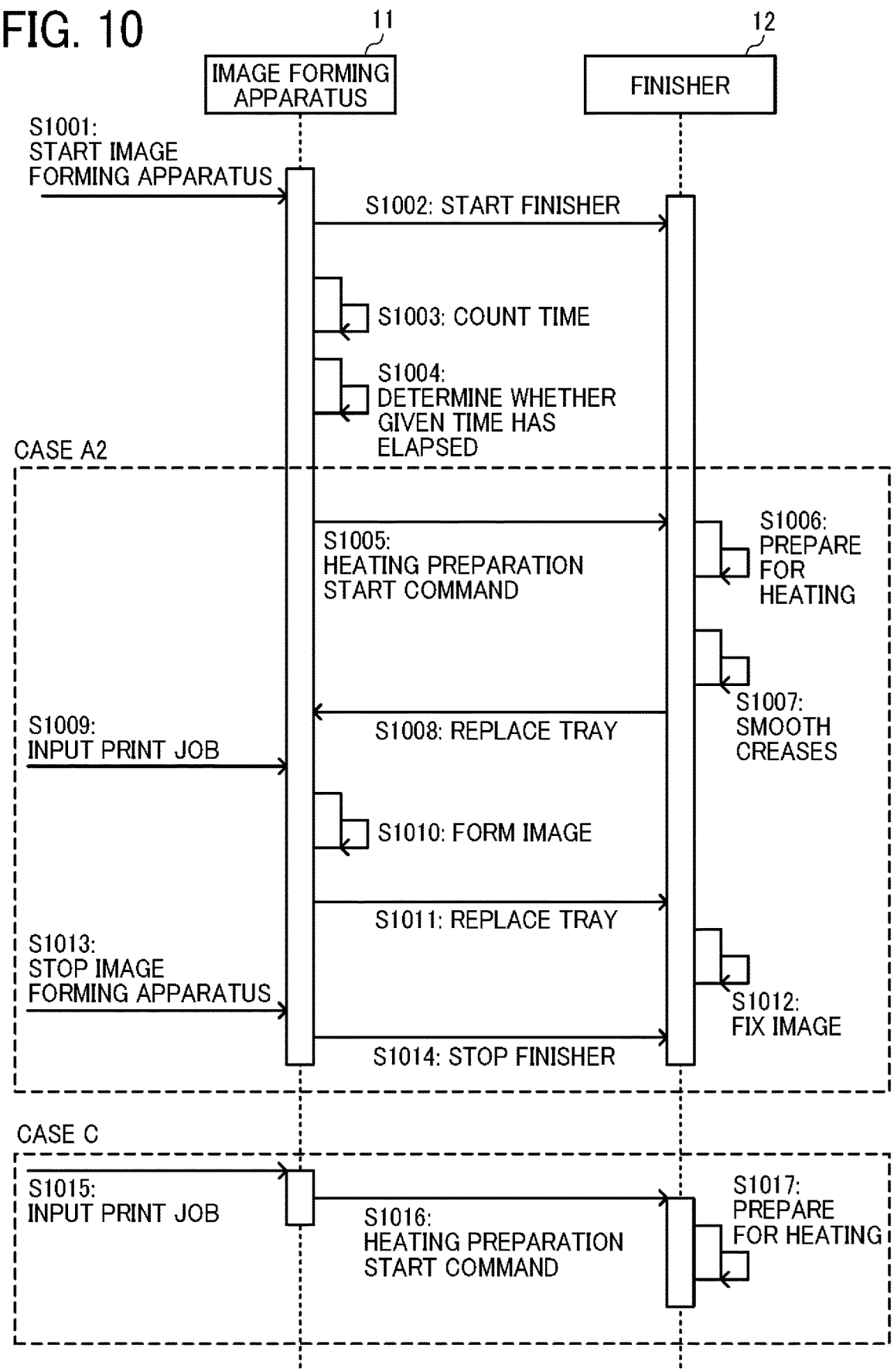
FIG. 10 is a sequence diagram illustrating processes executed by an image forming apparatus and a finisher according to the second embodiment of the present disclosure.

Referring now to FIGS. 9 and 10, a description is given of a second embodiment of the present disclosure.

The second embodiment is different from other embodiments in that the garment printer 10 starts heating when a print job is input during the heating standby before an elapse of a given time.

Initially with reference to FIG. 9, a description is given of a process executed by the garment printer 10 according to the second embodiment of the present disclosure.

FIG. 9 is a flowchart of the process executed by the garment printer 10 according to the second embodiment of the present disclosure.

The garment printer 10 starts the process with the power being turned on.

As the garment printer 10 is powered, the garment printer 10 starts the image forming apparatus 11 and the finisher 12 in step S901.

As the image forming apparatus 11 is started, the counter 611 starts counting time in step S902.

Note that the processing of steps S901 and S902 is substantially the same as the processing of steps S701 and S702.

In step S903, the garment printer 10 determines whether a print job is input. Here, the process branches out and takes different paths according to the determination. Specifically, when the garment printer 10 determines that the print job is not input (NO in step S903), the process proceeds to step S904.

In step S904, as in step S704, the elapsed time determination unit 610 determines whether a given time has elapsed. When the elapsed time determination unit 610 determines that the given time has not elapsed yet (NO in step S904), the process returns to step S902. Then, the garment printer 10 repeats the processing of steps S902 to S904. On the other hand, when the elapsed time determination unit 610 determines that the given time has elapsed (YES in step S904), the process proceeds to step S905.

When the garment printer 10 determines that the print job is input (YES in step S903), the process jumps to step S905. An input of a print job increases the probability of execution of the printing process. Therefore, in step S905, the garment printer 10 prepares for heating so as to quickly execute the printing process. Specifically, when the print job is input, the print job receiving unit 620 notifies the heating control unit 640 that the print job is input. In response to the notification, the heating control unit 640 prepares for heating in step S905.

After preparing for heating in step S905, the print job receiving unit 620 receives a print job input in step S906. Note that, when the garment printer 10 determines that the print job is input (YES) in step S903, the process jumps to step S907 from step S905, obviating step S906, because the print job is already input.

In step S907, the garment printer 10 executes the printing process.

In step S908, the power is turned off.

Thus, the process ends.

Note that the processing of steps S907 and S908 is substantially the same as the processing of steps S707 and S708.

Referring now to FIG. 10, a description is given of processes executed by the image forming apparatus 11 and the finisher 12 according to the second embodiment of the present disclosure.

FIG. 10 is a sequence diagram illustrating the processes executed by the image forming apparatus 11 and the finisher 12 according to the second embodiment of the present disclosure.

The processing of steps S1001 to S1014 is substantially the same as the processing of steps S801 to S814 described above. Therefore, a detailed description of the processing of steps S1001 to S1014 is herein omitted. Note that a case A2 illustrated in FIG. 10 is substantially the same as the case A1 illustrated in FIG. 8. That is, the case A2 is a case in which the elapsed time determination unit 610 determines that a given time has elapsed.

On the other hand, in a case C in which a print job is input to the image forming apparatus 11 in step S1015 during a heating standby, the print job receiving unit 620 notifies the heating control unit 640 that the print job is input.

In step S1016, the heating control unit 640 transmits a heating preparation start command to the heating unit 650 of the finisher 12.

In response to the command, the heating unit 650 raises the temperature to prepare for heating unit in step S1017.

After the heating preparation in step S1017, the printing process is executed as in steps S1007 to S1014.

According to the second embodiment, the garment printer 10 waits to raise the temperature of the heating unit 650 until the given time has elapsed after starting the image forming apparatus 11. However, when a print job is input while the garment printer 10 waits to raise the temperature of the heating unit 650, that is, before the elapsed time elapses, the garment printer 10 starts raising the temperature of the heating unit 650 in response to the print job. Accordingly, the garment printer 10 efficiently executes the printing process.

Figure 11:
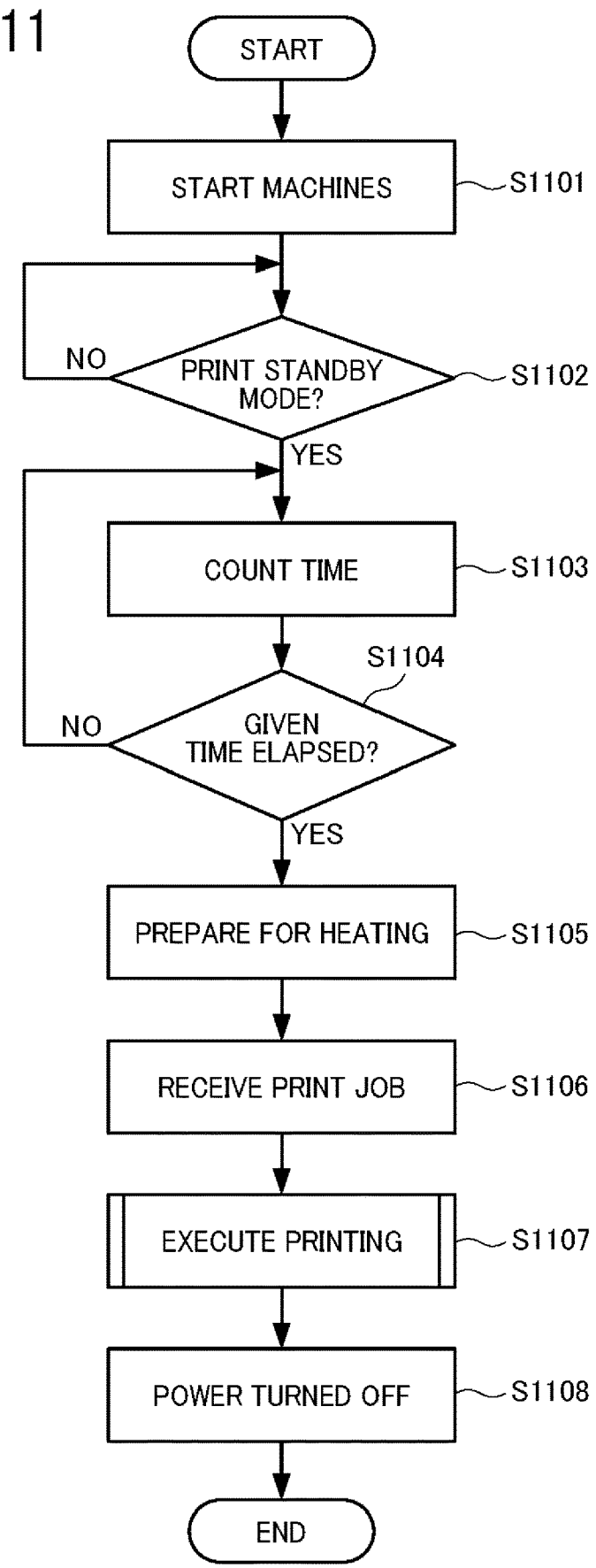
FIG. 11 is a flowchart of a process executed by a garment printer according to a third embodiment of the present disclosure.
Figure 12:
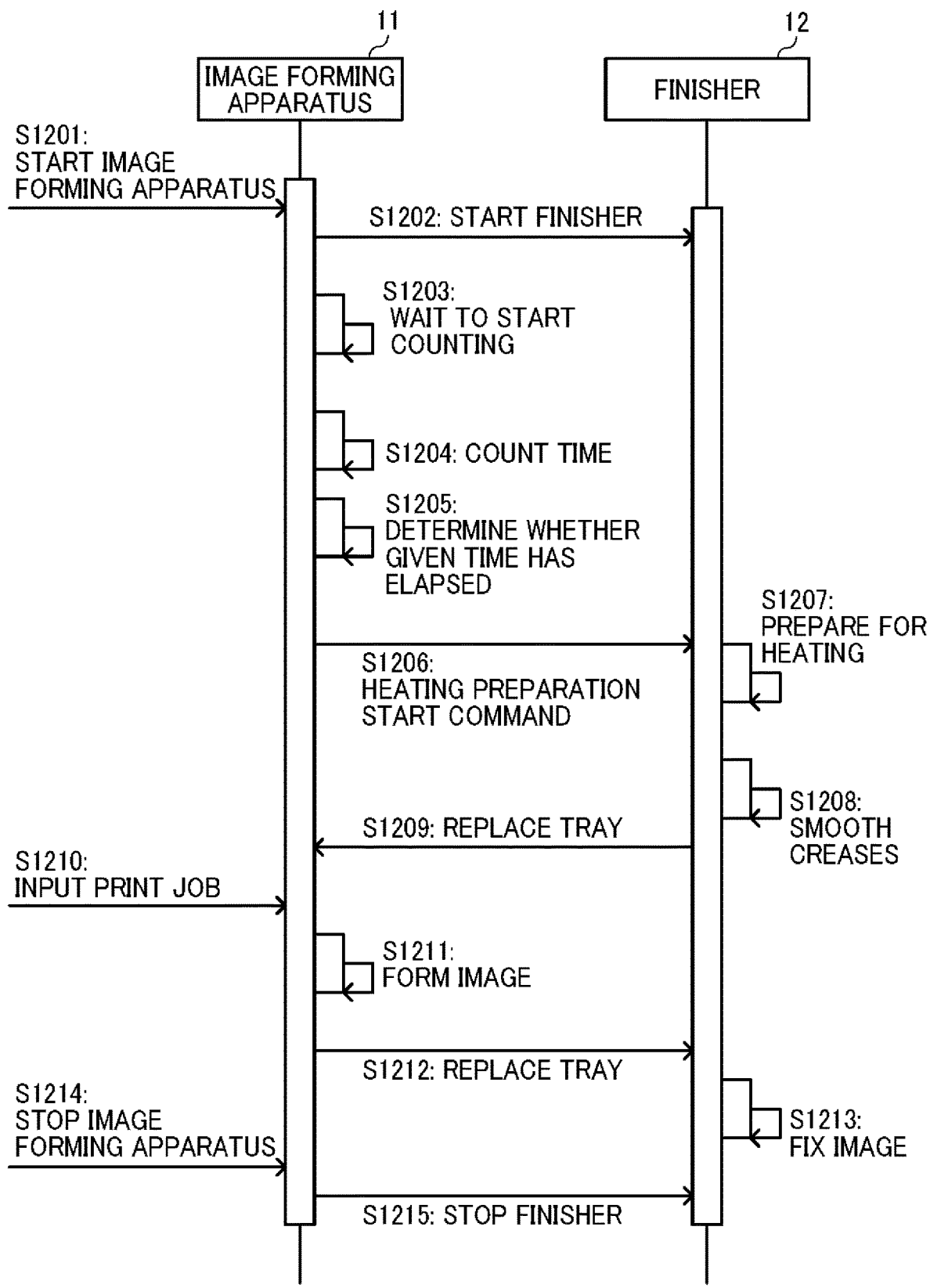
FIG. 12 is a sequence diagram illustrating processes executed by an image forming apparatus and a finisher according to the third embodiment of the present disclosure.

Referring now to FIGS. 11 and 12, a description is given of a third embodiment of the present disclosure.

The third embodiment is different from the other embodiments in that the counter 611 starts counting an elapsed time when the garment printer 10 is ready to execute the printing process.

Initially with reference to FIG. 11, a description is given of a process executed by the garment printer 10 according to the third embodiment of the present disclosure.

FIG. 11 is a flowchart of the process executed by the garment printer 10 according to the third embodiment of the present disclosure.

The garment printer 10 starts the process with the power being turned on.

As the garment printer 10 is powered, the garment printer 10 starts the image forming apparatus 11 and the finisher 12 in step S1101.

Note that the processing of step S1101 is substantially the same as the processing of step S701.

In step S1102, the garment printer 10 determines whether the garment printer 10 is in a print standby mode. Here, the process branches out and takes different paths according to the determination.

Now, a detailed description is given of the print standby mode.

The image forming apparatus 11 and the finisher 12 may execute start-up processing, head maintenance, and the like, after start-up. In such a case, if activation of machine causes the counter 611 to start counting as in the first embodiment, the heating unit 650 might be heated, although the garment printer 10 is not in a printable state. In short, such heating of the heating unit 650 wastes energy. To address such a situation, in the third embodiment, the garment printer 10 determines whether the garment printer 10 is in the print standby mode in step S1102. Here, the process branches out and takes different paths according to the determination.

When the garment printer 10 determines that the garment printer 10 in not in the print standby mode (NO in step S1102), the process returns to step S1102 where the garment printer 10 repeats the processing of step S1102. When the garment printer 10 determines that the garment printer 10 is in the print standby mode (YES in step S1102), the process proceeds to step S1103. The garment printer 10 determines whether the garment printer 10 is in the print standby mode based on, e.g., whether the operation receiving unit 630 is ready to receive an operation or instruction. In this case, the operation receiving unit 630 notifies the counter 611 that the operation receiving unit 630 is ready to receive the operation or instruction. In response to the notification, the counter 611 starts measuring time. Note that the garment printer 10 may determine whether the garment printer 10 is in the print standby mode on a basis other than the basis described above.

As the garment printer 10 is in the print standby mode, the counter 611 starts counting time in step S1103.

In step S1104, the elapsed time determination unit 610 determines whether a given time has elapsed. Here, the process branches out and takes different paths according to the determination.

Note that the processing of steps S1104 to S1108 is substantially the same as the processing of steps S704 to S708 described above. Therefore, a detailed description of the processing of steps S1104 to S1108 is herein omitted.

Referring now to FIG. 12, a description is given of processes executed by the image forming apparatus 11 and the finisher 12 according to the third embodiment of the present disclosure.

FIG. 12 is a sequence diagram illustrating the processes executed by the image forming apparatus 11 and the finisher 12 according to the third embodiment of the present disclosure.

In step S1201, the image forming apparatus 11 is started.

As the image forming apparatus 11 is started, the finisher 12 is started in step S1202.

In step S1203, the counter 611 waits to start counting until the image forming apparatus 11 and the finisher 12 enter the print standby mode.

After the image forming apparatus 11 and the finisher 12 enter the print standby mode, the counter 611 starts counting time in step S1204.

Note that the processing of steps S1204 to S1215 is substantially the same as the processing of steps S803 to S814 described above. Therefore, a detailed description of the processing of steps S1204 to S1215 is herein omitted.

According to the third embodiment, the garment printer 10 delays the timing of starting the time count until the image forming apparatus 11 and the finisher 12 enter the print standby mode. In other words, the counter 611 starts measuring an elapsed time in response to a print job being executable. Thus, the garment printer 10 saves energy.

Figure 13:
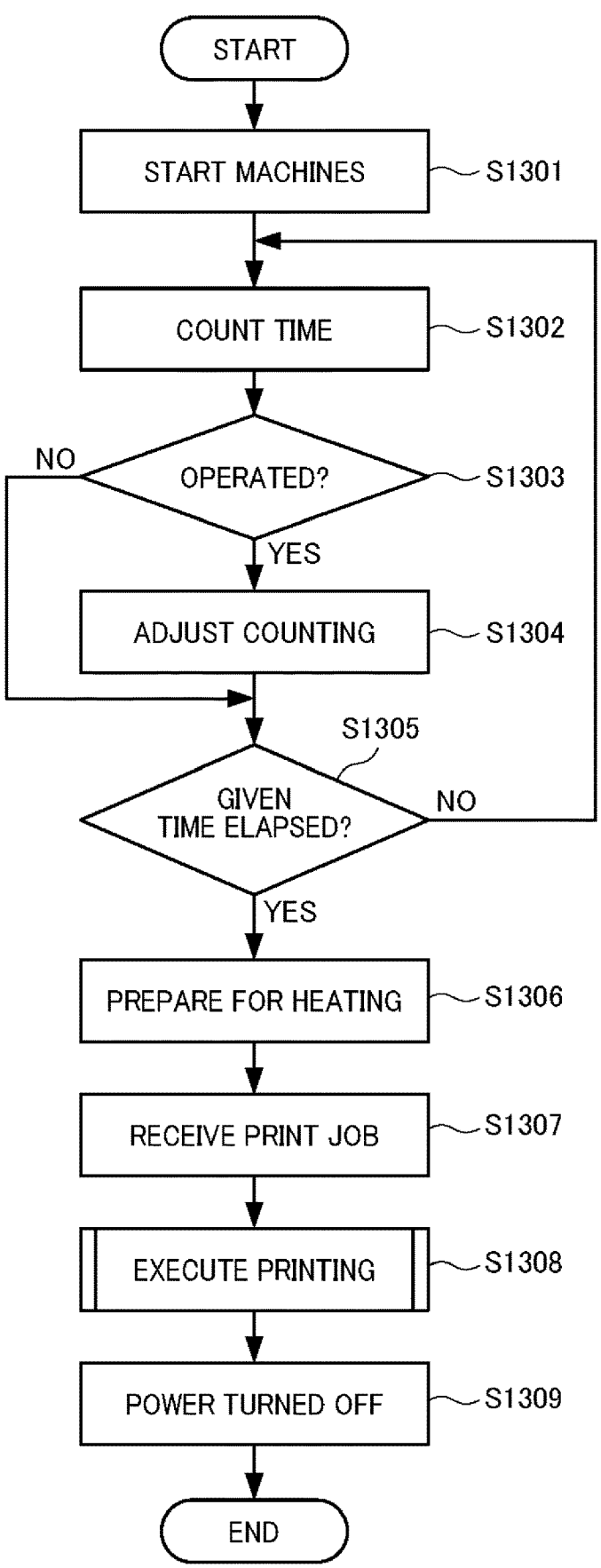
FIG. 13 is a flowchart of a process executed by a garment printer according to a fourth embodiment of the present disclosure.
Figure 14:
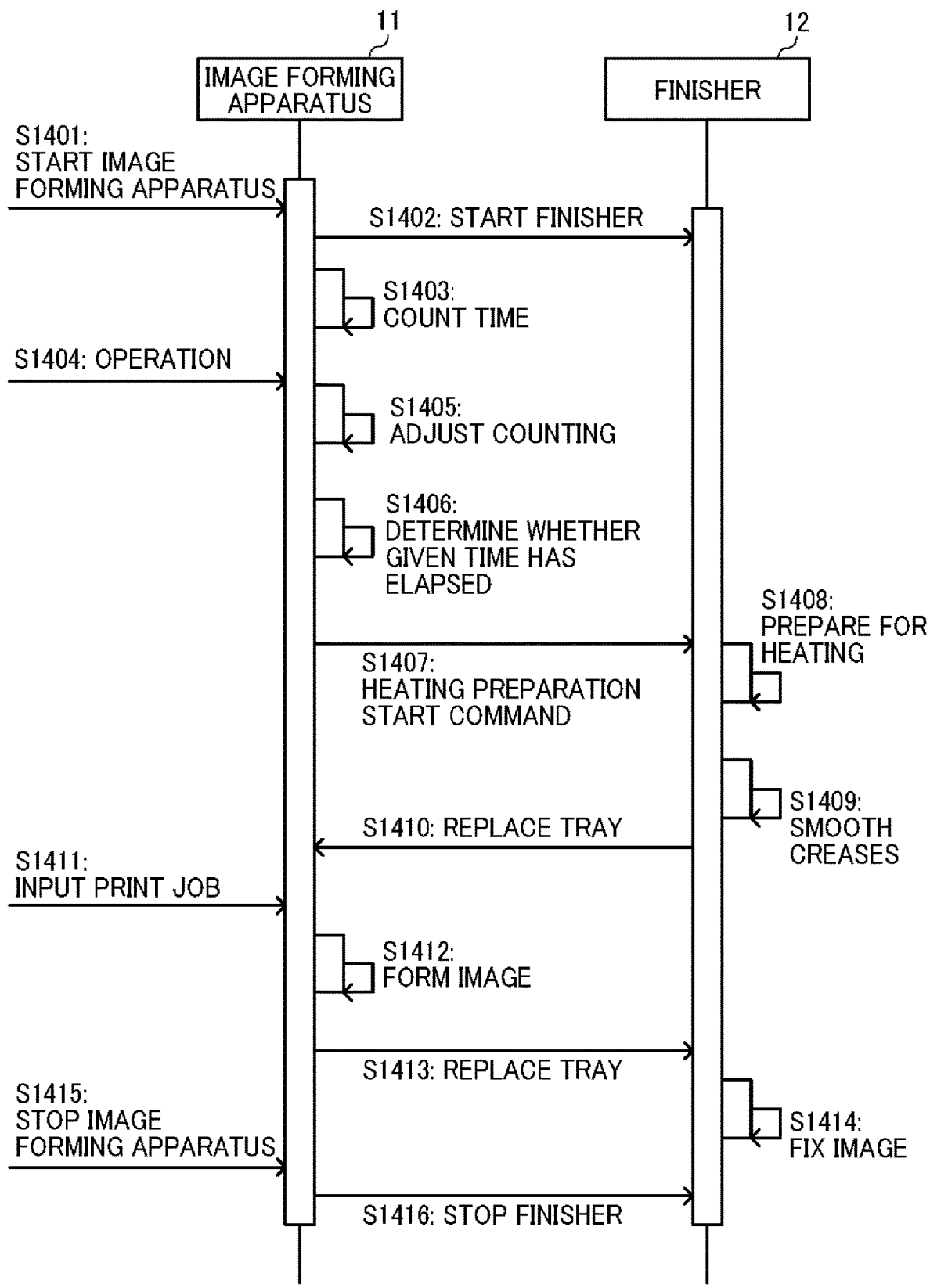
FIG. 14 is a sequence diagram illustrating processes executed by an image forming apparatus and a finisher according to the fourth embodiment of the present disclosure.

Referring now to FIGS. 13 and 14, a description is given of a fourth embodiment of the present disclosure.

The fourth embodiment is different from the other embodiments in that the time counting by the counter 611 is adjusted when the garment printer 10 is operated.

Initially with reference to FIG. 13, a description is given of a process executed by the garment printer 10 according to the fourth embodiment of the present disclosure.

FIG. 13 is a flowchart of the process executed by the garment printer 10 according to the fourth embodiment of the present disclosure.

The garment printer 10 starts the process with the power being turned on. As the garment printer 10 is powered, the garment printer 10 starts the image forming apparatus 11 and the finisher 12 in step S1301.

As the image forming apparatus 11 is started, the counter 611 starts counting time in step S1302.

Note that the processing of steps S1301 and S1302 is substantially the same as the processing of steps S701 and S702.

In step S1303, the garment printer 10 determines whether the garment printer 10 is operated by a user. Here, the process branches out and takes different paths according to the determination.

Now, a detailed description is given of the operation that the garment printer 10 receives from, e.g., a user.

In some cases, a user operates the garment printer 10 in order to change settings or the like after starting the garment printer 10. In such a case, execution of the printing process is low probability while the user operates the garment printer 10. That is, it is preferable not to raise the temperature of the heating unit 650 while the user operates the garment printer 10. For this reason, in the fourth embodiment, the garment printer 10 determines whether the garment printer 10 is operated in step S1303. Here, the process branches out and takes different paths according to the determination.

When the garment printer 10 determines that the garment printer 10 is operated by a user (YES in step S1303), the process proceeds to step S1304.

In step S1304, the count adjustment unit 612 adjusts a counting process of counting an elapse of time performed by the counter 611. Specifically, in a case in which the garment printer 10 is operated, the operation receiving unit 630 notifies the count adjustment unit 612 of reception of the operation. In response to the notification, the count adjustment unit 612 executes a count adjusting process to adjust the counting process performed by the counter 611.

The count adjusting process is not particularly limited. For example, in a case in which a button is pressed, the count adjustment unit 612 resets the time count to zero. Alternatively, the count adjustment unit 612 may stop the counter 611 from counting time for a given period of time each time the button is pressed. In another case in which the menu is opened for further operation, the count adjustment unit 612 may stop the counter 611 from counting time when the menu is opened. Thereafter, when the menu is closed, the count adjustment unit 612 may cause the counter 611 to resume the time count.

The count adjustment in step S1304 is followed by step S1305. In step S1305, the elapsed time determination unit 610 determines whether a given time has elapsed. Here, the process branches out and takes different paths according to the determination. Note that a user may operate the garment printer 10 through the operation panel 150 or remotely operate the garment printer 10 from the terminal 20.

On the other hand, when the garment printer 10 determines that the garment printer 10 is not operated by a user (NO in step S1303), the process proceeds to step S1305.

As described above, in step S1305, the elapsed time determination unit 610 determines whether the given time has elapsed. Here, the process branches out and takes different paths according to the determination.

Note that the processing of steps S1305 to S1309 is substantially the same as the processing of steps S704 to S708 described above. Therefore, a detailed description of the processing of steps S1305 to S1309 is herein omitted.

Referring now to FIG. 14, a description is given of processes executed by the image forming apparatus 11 and the finisher 12 according to the fourth embodiment of the present disclosure.

FIG. 14 is a sequence diagram illustrating the processes executed by the image forming apparatus 11 and the finisher 12 according to the fourth embodiment of the present disclosure.

In step S1401, the image forming apparatus 11 is started.

As the image forming apparatus 11 is started, the finisher 12 is started in step S1402.

In step S1403, the counter 611 counts time.

Note that the processing of steps S1401 to S1403 is substantially the same as the processing of steps S801 to S803.

In step S1404, the operation receiving unit 630 receives an operation from a user.

As the operation receiving unit 630 receives the operation, in step S1405, the count adjustment unit 612 adjusts the counting process performed by the counter 611.

In step S1406, the elapsed time determination unit 610 determines whether the given time has elapsed.

Note that the processing of steps S1406 to S1416 is substantially the same as the processing of steps S804 to S814 described above. Therefore, a detailed description of the processing of steps S1406 to S1416 is herein omitted.

According to the fourth embodiment, when the garment printer 10 is operated by, e.g., a user, the garment printer 10 delays the timing of starting the temperature rise of the heating unit 650, thereby saving energy.

Referring now to FIG. 15, a description is given of a fifth embodiment of the present disclosure.

FIG. 15 is a diagram illustrating an example of the operation panel 150 according to the fifth embodiment of the present disclosure.

The first to fourth embodiments described above can be arbitrarily set by a user. The functions of the embodiments described above can be combined or exchanged.

In the fifth embodiment, a user can select whether to start heating the heating unit 650 upon startup of the garment printer 10, through a screen on the operation panel 150 illustrated in FIG. 15. For example, when the user presses an "OK" button illustrated in FIG. 15, the heating control unit 640 causes the temperature of the heating unit 650 to rise simultaneously with the startup of the garment printer 10. On the other hand, when the user presses a "CA" button, the elapsed time determination unit 610 is enabled. When a given time has elapsed, the heating control unit 640 causes the temperature of the heating unit 650 to rise.

Note that, FIG. 15 illustrates, as an example, the operation panel 150 through which a user selects a function. Alternatively, for example, the user may select whether to start heating the heating unit 650 immediately after the startup of the garment printer 10 through a screen on the terminal 20.

According to the fifth embodiment, a user can select a setting for rising the temperature of the heating unit 650 as appropriate for the usage conditions. In other words, the garment printer 10 can receive a selection whether to control the temperature of the heating unit 650 based on a determination result as to whether the given time has elapsed.

According to the embodiments described above, there are provided an information processing device, an image forming apparatus, an image forming system, an information processing method, and a non-transitory computer-readable storage medium storing computer-readable program code that causes the information processing device to execute the information processing method, to reduce power consumption and enhance energy saving.

The functions of the embodiments of the present disclosure described above can be implemented by computer-readable programs described in programming languages such as C, C++, C#, and Java (registered trademark). The programs of the embodiments of the present disclosure can be stored in a computer-readable storage medium such as a hard disk device, a compact disc read-only memory (CD-ROM), a magneto-optical disc (MO), a digital versatile disc (DVD), a flexible disk, an electrically erasable programmable read-only memory (EEPROM), or an erasable programmable read-only memory (EPROM), thereby being distributable. Alternatively, the programs may be transmitted via a network in a format that allows another device to receive and execute the programs.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by the ASIC, prepared by interconnecting an appropriate network of conventional component circuits or by a combination thereof with one or more conventional general-purpose microprocessors and/or signal processors programmed accordingly.

What is claimed is:

1. A garment printer, comprising:
a heater which performs heating of a garment; and
circuitry configured to:
control a temperature of the heater;
implement a pre-determined time delay in response to a trigger before raising the temperature of the heater;
in response to a determination that a print job has been received by the garment printer during the pre-determined time delay, to override the pre-determined time delay, to raise the temperature of the heater to smooth out creases on the garment, to form an image on the garment based on the print job, and to fix the image to the garment using the heater; and
in response to a determination that the print job has not been received during the pre-determined time delay and the pre-determined time delay has elapsed, to raise the temperature of the heater to smooth out creases on the garment, to receive the print job, to form an image on the garment based on the print job, and to fix the image to the garment using the heater.

2. The garment printer of claim 1, wherein:
the trigger comprises a startup of the garment printer.

3. The garment printer of claim 2, wherein:
the circuitry is configured to determine if a user is accessing user controls of the garment printer during the pre-determined time delay, and to extend the pre-determined time delay before raising the temperature of the heater in response to determining that the user is accessing the user controls.

4. The garment printer of claim 3, wherein:
the circuitry is configured to repeatedly extend the pre-determined time delay as the user continues to access the user controls.

5. The garment printer of claim 1, wherein:
the trigger comprises a transition of the garment printer from a non-printable state to a printable state.

6. A method operable by a garment printer, the method comprising:
implementing a pre-determined time delay in response to a trigger before raising a temperature of a heater of the garment printer, wherein the heater performs heating of a garment;
in response to determining that a print job has been received by the garment printer during the pre-determined time delay, performing the steps of:
overriding the pre-determined time delay and raising the temperature of the heater to smooth out creases on the garment;
forming an image on the garment based on the print job; and
fixing the image to the garment using the heater; and
in response to determining that the print job has not been received during the pre-determined time delay and the pre-determined time delay has elapsed, performing the steps of:
raising the temperature of the heater to smooth out creases on the garment;
forming an image on the garment based on the print job; and
fixing the image to the garment using the heater.

7. The method of claim 6, wherein:
the trigger comprises a startup of the garment printer.

8. The method of claim 7, further comprising:
determining if a user is accessing user controls of the garment printer during the pre-determined time delay; and
extending the pre-determined time delay before raising the temperature of the heater in response to determining that the user is accessing the user controls.

9. The method of claim 8, wherein extending the pre-determined time delay further comprises:
repeatedly extend the pre-determined time delay as the user continues to access the user controls.

10. The method of claim 6, wherein:
the trigger comprises a transition of the garment printer from a non-printable state to a printable state.

11. A non-transitory computer-readable medium storing programmed instructions which, when executed by a processor of a garment printer, directs the processor to:
implement a pre-determined time delay in response to a trigger before raising a temperature of a heater of the garment printer, wherein the heater performs heating of a garment;
in response to a determination that a print job has been received by the garment printer during the pre-determined time delay, to override the pre-determined time delay and raise the temperature of the heater to smooth out creases on the garment, to form an image on the garment based on the print job, and to fix the image to the garment using the heater; and
in response to a determination that the print job has not been received during the pre-determined time delay and the pre-determined time delay has elapsed, to raise the temperature of the heater to smooth out creases on the garment, to form an image on the garment based on the print job, and to fix the image to the garment using the heater.

12. The non-transitory computer-readable medium of claim 11, wherein:
the trigger comprises a startup of the garment printer.

13. The non-transitory computer-readable medium of claim 12, wherein the programmed instructions further direct the processor to:
determine if a user is accessing user controls of the garment printer during the pre-determined time delay; and
extend the pre-determined time delay before raising the temperature of the heater in response to determining that the user is accessing the user controls.

14. The non-transitory computer-readable medium of claim 13, wherein the programmed instructions further direct the processor to:
repeatedly extend the pre-determined time delay as the user continues to access the user controls.

15. The non-transitory computer-readable medium of claim 11, wherein:
the trigger comprises a transition of the garment printer from a non-printable state to a printable state.

* * * * *